United States Patent [19]
Howe
[11] 3,717,726
[45] Feb. 20, 1973

[54] NOISE IMMUNE COLOR KILLER CIRCUIT

[75] Inventor: Derek Henry Howe, Cambridge, England
[73] Assignee: Pye Limited, Cambridge, England

[22] Filed: March 25, 1971
[21] Appl. No.: 128,092

[30] Foreign Application Priority Data

April 10, 1970 Great Britain....................17,208/70

[52] U.S. Cl...........................178/5.4 CK, 178/5.4 P
[51] Int. Cl...............................................H04n 9/48
[58] Field of Search..................178/5.4 R, 5.4 CK, 5.4 P, 5.4 AC

[56] References Cited

UNITED STATES PATENTS

| | | | |
|---|---|---|---|
| 3,492,417 | 1/1970 | Scholz | 178/5.4 P |
| 3,534,156 | 10/1970 | Henze | 178/5.4 P |
| 3,548,084 | 12/1970 | Kroner | 178/5.4 CK |

OTHER PUBLICATIONS

Patchett, Color Television – PAL System, March, 1969, pp. 182–191.

*Primary Examiner*—Robert L. Richardson
*Attorney*—Frank R. Trifari

[57] ABSTRACT

A color killer circuit for preferably a PAL color set has a gate in the chrominance channel. When a color signal is being received a burst separator applies the color burst to a phase detector to enable the gate. To reduce the possibility that noise will enable the gate a voltage multiplier is coupled between the phase detector and the gate.

6 Claims, 2 Drawing Figures

NOISE IMMUNE COLOR KILLER CIRCUIT

Figure 1:
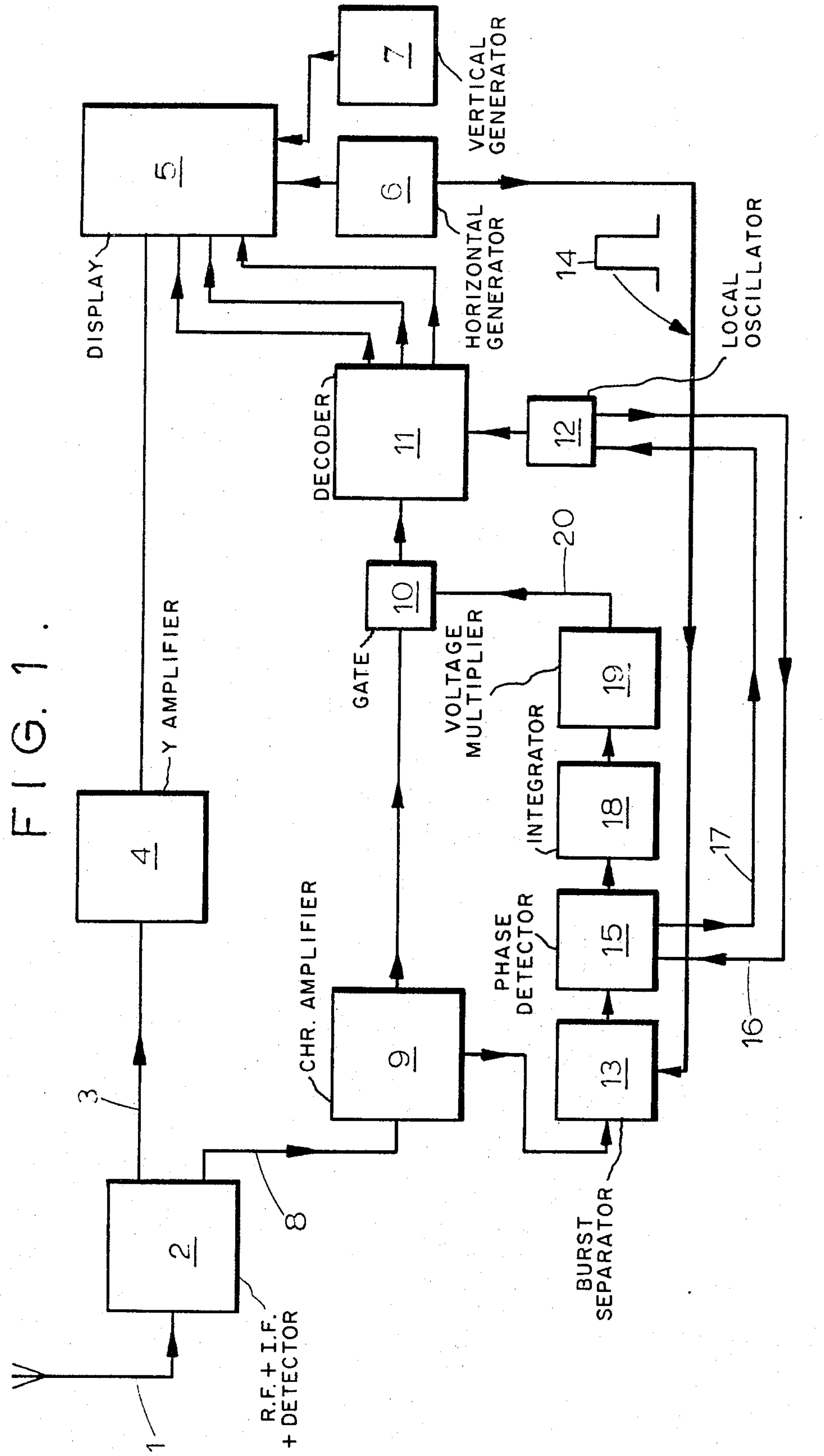

This invention relates to a color killer circuit arrangement for a color television receiver for displaying a color television signal in which brightness information is modulated on a main carrier and color information on a subcarrier and a burst of the subcarrier is transmitted in the blanking periods between successive lines of the transmitted image, a property of the subcarrier burst alternating from line to line, said arrangement comprising a detector for said alternating property, means for feeding said subcarrier bursts to an input of said detector, and a gate circuit included in a channel for the color information, an output of the detector being coupled to a gating signal input terminal of the gate circuit via a rectifier circuit for causing said channel to be transmissive during reception of said color television signal and cut off during reception of a monochrome signal.

Such color killer circuits are normally employed in color television receivers in order to disable the color information channel when a monochrome signal is being received because otherwise spurious signals transmitted by the color channel at such a time may result in annoying color effects appearing on the receiver display screen. Detection of the alternating property of the subcarrier burst (which may be its phase in the PAL system) results normally in the appearance of an alternating signal at the detector output. This alternating signal will have a frequency equal to half the line frequency, i.e., equal to approximately 7.8 KHz for the 625 line systems. It is rectified by the rectifier and then applied as a d.c. control signal to the gate which is rendered transmissive thereby. Absence of the "swinging" subcarrier burst will result in this control signal being absent, and this is arranged to cause the gate to be blocked. This will be the case when a monochrome signal is being received.

It is necessary with such arrangements that the color killer circuit should itself be reasonably insensitive to interference because otherwise such interference may be rectified by the rectifier during the reception of a monochrome signal and be applied to the gating terminal of the gate, causing it to become transmissive. In order to filter out the noise as much as possible a high Q tuned circuit is normally provided in the coupling between the detector output and the rectifier input, this circuit being tuned to half the line frequency so that the wanted detector output (if present) is passed on to the rectifier while any noise is suppressed. The provision of such a high Q (and fairly low frequency) tuned circuit is a disadvantage because of the costs of its manufacture and adjustment. It is an object of the invention to enable the tuned circuit to be dispensed with.

The invention provides a color killer circuit arrangement for a color television receiver for displaying a color television signal in which brightness information is modulated on a main carrier and color information is modulated on a subcarrier and a burst of the subcarrier is transmitted in the blanking periods between successive lines of the transmitted image, a property of the subcarrier burst alternating from line to line, said arrangement comprising a detector for said alternating property, means for feeding said subcarrier burst to an input of said detector, and a gate circuit included in a channel for the color information, an output of the detector being coupled to a gating signal input terminal of the gate circuit via a voltage multiplier rectifier circuit for causing said channel to be transmissive during reception of said color television signal and cut off during reception of a monochrome signal, said gate circuit being constructed and arranged to be insensitive to outputs of said rectifier circuit which lie below a predetermined threshold and to be responsive to outputs of said rectifier circuit which lie above said threshold.

Figure 2:
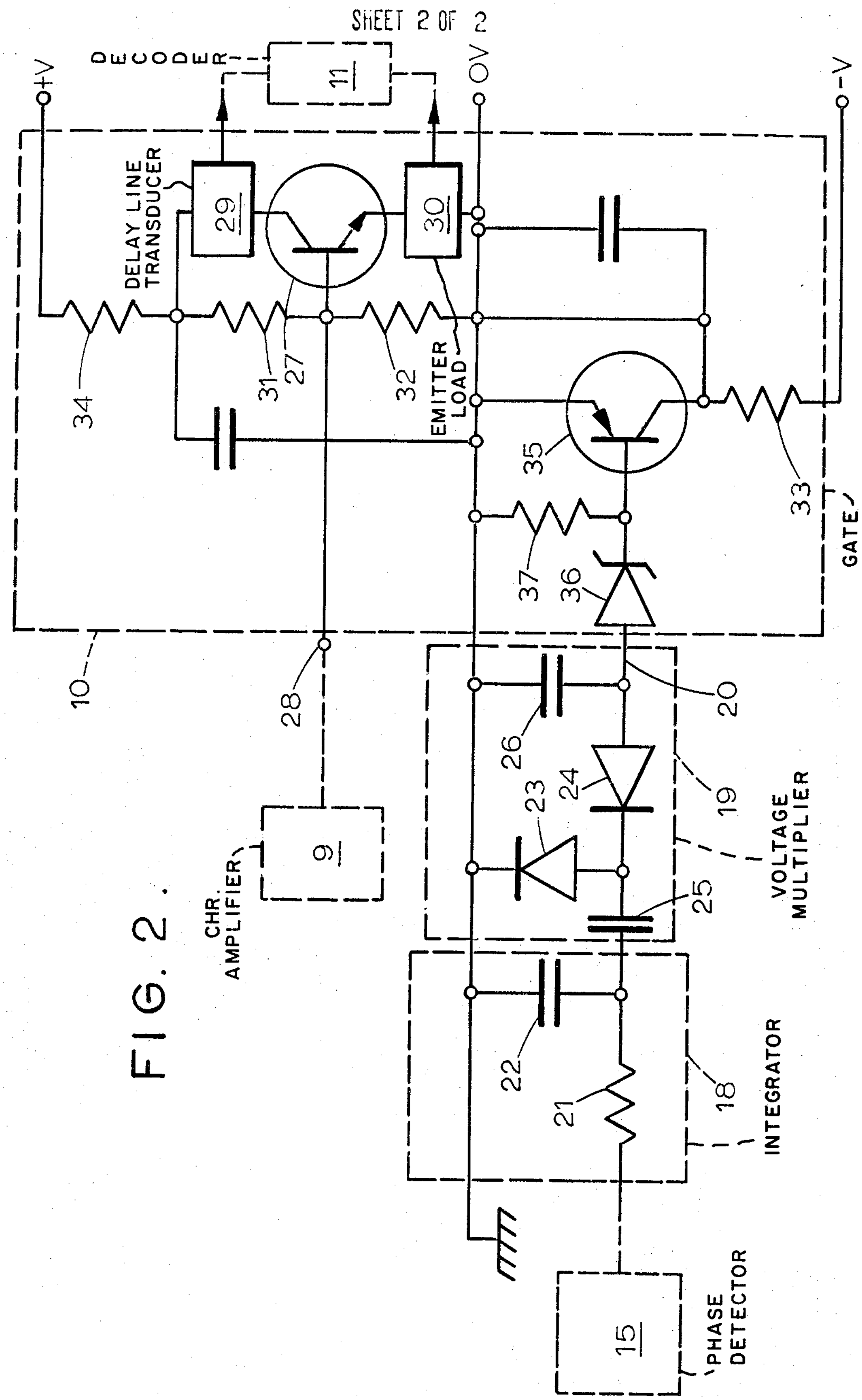

An embodiment of the invention will now be described, by way of example, with reference to the accompanying diagrammatic drawing, in which:

FIG. 1 shows a block diagram of the main parts of a color television receiver for a PAL color television signal; and FIG. 2 shows part of the receiver of FIG. 1 in more detail.

In FIG. 1 a PAL color television signal is received by an aerial 1 and RF and IF amplified and detected in section 2 in the usual way. A luminance signal appears at an output 3 thereof, is amplified in an amplifier 4 and applied to a display section 5 which includes a color display cathode-ray tube. The cathode-ray tube is scanned by means of a line timebase generator 6 and a field timebase generator 7.

A subcarrier signal modulated with color information appears at an output 8 of section 2 and is amplified by an amplifier 9. Bursts of subcarrier occurring in the line blanking periods of the transmitted image are also amplified by amplifier 9. The phase of these bursts alternates between two values from line to line in well-known manner. The output of amplifier 9 is coupled via a gate and amplifier circuit 10 to a decoder 11 for the color information, whence the color information is applied to the display section 5 in the usual manner. The decoding of the (phase-modulated) color information is accomplished with the aid of a reference subcarrier signal generated by a local oscillator 12.

The subcarrier bursts are selected from the signal obtained from a part of amplifier 9 by means of a burst gage separation amplifier 13 supplied with gating pulses 14 which may be obtained, as shown, from the line timebase generator or, may be derived from the sync. separator stage of the receiver. The selected bursts from the output of amplifier 13 are phase-detected and D.C. amplified in a phase discriminator and D.C. amplifier 15 using a signal applied thereto from the local oscillator 12 via a lead 16 as a reference. The result of phase comparison of the bursts with the output of the oscillator 12 is fed back to the oscillator over a lead 17 in the usual way to maintain the phase of the oscillator in the desired relationship with the phase of the received subcarrier.

Because the phase of the burst alternates from line to line, the output of amplifier 15 will contain an alternating component at half line frequency. This is used in known manner to control a bistable switch to match the chrominance channel to the alternating nature of an aspect of the modulated subcarrier which occurs with the PAL system from line to line. This feature is not shown in the drawing for the sake of clarity.

The output of the phase discriminator and D.C. amplifier 15 is also fed to an integrating circuit 18 in order to reduce any interference present therein. To this end the time-constant of the circuit 18 must be as long as possible but not so long that the component of half line frequency present in the output of discriminator 15 will be appreciably attenuated.

The output of integrating circuit 18 is fed to a voltage multiplier rectifier circuit 19 and a D.C. voltage proportional to the magnitude of the alternating component at half line frequency appears at an output 20 thereof. It will be appreciated that an effect of the multiplying action of circuit 19 will be to increase the magnitude of any difference there may be at the output 20 between the amplitudes of the half line frequency component and any residual noise present in the output of circuit 18, so that these two outputs may be more easily separated.

The output 20 is fed to a gating signal input terminal of gate and amplifier circuit 10 to cause the circuit 10 to transmit signals from amplifier 9 to decoder 11 when the alternating component of half line frequency is present at the output of circuit 18, i.e., when a PAL color television signal is being received, and to cause the circuit 10 to stop any signals from being transmitted from amplifier 9 to decoder 11 when no component of half line frequency is present at the output of circuit 18, i.e., when a monochrome signal is being received. To this end the circuit 10 may comprise a transistor which is normally cut off and which is rendered conductive by an output from voltage multiplier 19.

In order to stop any interference appearing at the output 20 from affecting the gage circuit 10, this circuit is constructed and arranged to be responsive to an output at 20 only when that output exceeds a predetermined threshold value, which value is higher than the expected level of interference at output 20 and lower than the expected signal level at output 20 due to the component of half line frequency. To this end a Zener diode thresholding circuit may be provided in the gating signal input circuit of gate circuit 10.

FIG. 2 shows the components 18, 19 and 10 of FIG. 1 in more detail.

In FIG. 2 the integrating circuit 18 comprises a resistor 21 and capacitor 22 in the usual way. The voltage multiplier 19 is constructed as a normal voltage doubler comprising a pair of rectifiers 23 and 24 and a pair of capacitors 25 and 26.

The gate circuit 10 includes a delay line driver n-p-n transistor 27 included in the color information channel of the receiver of FIG. 1. The amplified subcarrier modulated with color information is applied to terminal 28 from amplifier 9 and appears across delay line input transducer 29 and emitter load 30 when (and only when) transistor 27 is conducting. The conductivity of transistor 27 is determined by the values of resistors 31, 32, 33 and 34 and by the conductivity state of a p-n-p transistor 35. The values of these resistors are chosen so that, when transistor 35 is cut off, transistor 27 is also cut off by reverse bias at its base. With transistor 35 conducting hard however, the potential at the junction of resistors 33 and 32 approaches earth, with the result that resistors 31, 32 and 34 provide forward bias to the base of transistor 27.

The conductivity of transistor 35 is determined by the output of the doubler circuit 19, which is fed to its base via a voltage thresholding device comprising a Zener diode 36 and resistor 37.

The Zener voltage of diode 36 is chosen such that it will conduct hard when a negative half-line-frequency-signal-derived voltage appears across capacitor 26, but substantially will not conduct due to a negative noise-derived voltage appearing across this capacitor.

During conduction of diode 36, i.e., when a color signal is being received, current will flow in the base-emitter junction of transistor 35 to saturate that transistor. (Transistor 35 is otherwise in a non-conducting state due to the absence of forward bias on its base). Thus transistor 27 (which is also otherwise cut off) also conducts at this time. The combination of Zener diode 36, resistor 37 and base-emitter junction of transistor 35 ensures that a well-defined ON/OFF action is available at an input threshold voltage equal to the Zener voltage of diode 36 plus the base-emitter voltage of transistor 35, with resistor 37 stabilizing this action.

It will be appreciated that the gate circuit 10 does not necessarily include a delay line driver transistor. The voltage swing available at the collector of transistor 35 may alternatively be employed to make and break the chrominance channel 9, 10, 11 at another position, for example in the amplifier 9 subsequent to the feed point of gage 13 (FIG. 1.) or in the decoder 11. A circuit according to the invention may accordingly be included in a PAL(S) receiver in which no delay line is used.

It will also be appreciated that the voltage multiplier 19 may be replaced e.g., by a voltage tripler, and that the integrating circuit 18 may be omitted.

What we claim is:

1. A color killer circuit for a color signal having a line to line alternating property color burst signal, said circuit comprising means for detecting said alternating property having an input coupled to receive color burst signal and an output; a color channel including a gate having an input coupled to receive said color signal and a threshold means for determining the level at which said gate circuit is enabled; and means for decreasing the probability that said gate circuit will be enabled by noise signals comprising a voltage multiplier circuit having an input coupled to said detecting means output and an output means coupled to said threshold means for supplying an enabling signal wherein the difference between said burst signal and noise is increased.

2. A circuit as claimed in claim 1 wherein said voltage multiplier comprises a voltage doubler.

3. A circuit as claimed in claim 1 during comprising an integrator coupled between said detector output and said multiplier input.

4. A circuit as claimed in claim 1 wherein said threshold means comprises a Zener diode.

5. A circuit as claimed in claim 4 wherein said gate comprises a non-forward biased first transistor in the common emitter configuration having a base direct current coupled to said diode, and a second transistor of opposite conductivity type than said first transistor and having a base direct current coupled to the collector of said first transistor, and being coupled to said color channel.

6. A circuit as claimed in claim 1 wherein said color signal comprises a PAL signal and said detector comprises a phase detector.

* * * * *